(12) United States Patent
Davis et al.

(10) Patent No.: US 7,418,501 B2
(45) Date of Patent: Aug. 26, 2008

(54) DYNAMIC EXTENSION OF NETWORK-ACCESSIBLE SERVICES

(75) Inventors: Douglas B. Davis, Raleigh, NC (US); John K. Gerken, III, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 916 days.

(21) Appl. No.: 10/836,692

(22) Filed: Apr. 30, 2004

(65) Prior Publication Data

US 2006/0031441 A1 Feb. 9, 2006

(51) Int. Cl.
G06F 15/173 (2006.01)
G06F 15/16 (2006.01)
(52) U.S. Cl. .................. 709/225; 709/217; 709/223
(58) Field of Classification Search ............. 709/217, 709/223, 225, 226
See application file for complete search history.

(56) References Cited

U.S. PATENT DOCUMENTS

| 5,771,381 | A  | * | 6/1998 | Jones et al. .................. 713/100 |
| 6,512,526 | B1 | * | 1/2003 | McGlothlin et al. ........ 715/762 |
| 6,571,245 | B2 | * | 5/2003 | Huang et al. ................. 707/10 |
| 6,879,672 | B2 | * | 4/2005 | Broussard et al. ...... 379/201.03 |
| 7,069,553 | B2 | * | 6/2006 | Narayanaswamy et al. . 717/173 |
| 2003/0084350 | A1 | | 5/2003 | Eibach et al. |
| 2003/0110167 | A1 | | 6/2003 | Kim |
| 2003/0110242 | A1 | | 6/2003 | Brown et al. |
| 2003/0187974 | A1 | | 10/2003 | Burbeck et al. |
| 2003/0188019 | A1 | | 10/2003 | Wesley |

FOREIGN PATENT DOCUMENTS

WO  WO 02082305 A2  10/2002

* cited by examiner

*Primary Examiner*—Ario Etienne
*Assistant Examiner*—Hussein Elchanti
(74) *Attorney, Agent, or Firm*—Marcia L. Doubet; Andre M. Gibbs

(57) ABSTRACT

Services deployed in a network computing environment (such as a Web services implementation model) are transparently extended. Preferably, handler components in an engine that processes requests and responses provide the extensions. A handler for outgoing messages adds the extensions to a response message that is created responsive to receiving a request message that asks for a service's available operations. A client receiving this response message can then invoke one of the extensions, without knowing that it is an extension. A handler for incoming messages checks received requests: if a request for an extension is received, the handler routes that message to a location other than the service itself; otherwise, incoming requests for operations that are actually available from the service are routed thereto. Extensions may provide additional operations such as, but not limited to, management operations, dynamic enabling/disabling of service operations, and/or controlled access to service operations—even though the service itself might contain no operations for these.

15 Claims, 8 Drawing Sheets

```xml
<?xml version="1.0" encoding="UTF-8"?>
<wsdl:definitions targetNamespace="http://www.ibm.com/..."
    xmlns:wsdl="http://schemas.xmlsoap.org/wsdl/"
    xmlns:sample="http//www.ibm.com/sample-namespace/"
    xmlns:soap="http://schemas.xmlsoap.org/wsdl/soap"
    xmlns:intf="http://www.ibm.com/intf-namespace/"
    ... >
```
*205*

```xml
<wsdl:message name="sampleNumber1Request">
    <wsdl:part name="portName" type="xsd:string"/>
    <wsdl:part name="sampleParameter" type="xsd:string"/>
</wsdl:message>

<wsdl:message name="sampleNumber1Responset">
    <wsdl:part name="result" type="xsd:boolean"/>
</wsdl:message>

<wsdl:message name="sampleNumber2Request">
    <wsdl:part name="portName" type="xsd:string"/>
</wsdl:message>

<wsdl:message name="sampleNumber2Response">
    <wsdl:part name="result" type="xsd:string"/>
</wsdl:message>
```
*210*

```xml
<wsdl:portType name="SamplePortType">

<wsdl:operation name="sampleNumber1">           221
    <wsdl:input message="intf:sampleNumber1Request"/>
    <wsdl:output message="intf:sampleNumber1Response"/>
</wsdl:operation>

<wsdl:operation name="sampleNumber2">
    <wsdl:input message="intf:sampleNumber2Request"/>
    <wsdl:output message="intf:sampleNumber2Response"/>
</wsdl:operation>

</wsdl:portType>
```
*215*  *220*

225
```
<sample:serviceType name="SampleService">
    <sample:portTypeList>
        <sample:portTypeRef="intf:Sample"/>
        ...
    </sample:portTypeList>
</sample:serviceType>
```

230
```
<wsdl:binding name="SampleSoapBinding"
        type="intf:SamplePortType">
    <soap:binding style="rpc"
            transport="http://schemas.xmlsoap.org/soap/http"/>
```
231
```
    <wsdl:operation name="sampleNumber1">
        <soap:operation soapAction="" style="rpc"/>
        <wsdl:input>
            <soap:body encodingStyle=
                    "http://schemas.xmlsoap.org/soap/encoding/"
                namespace=
                    "http://www.ibm.com/..."
                use="encoded"/>
        </wsdl:input>
        <wsdl:output>
            <soap:body
                encodingStyle=
                    "http://schemas.xmlsoap.org/soap/encoding/"
                namespace=
                    "http://www.ibm.com/..."
                use="encoded"/>
        </wsdl:output>
    </wsdl:operation>
    ...
</wsdl:binding>
```

```
</wsdl:definitions>
``` http://localhost/axis/services/StockQuoteService http://localhost/axis/services/StockQuoteService?wsdl

FIG. 5A
500

```xml
<?xml version="1.0" encoding="UTF-8"?>
```

205
```xml
<wsdl:definitions targetNamespace="http://www.ibm.com/..."
    xmlns:wsdl="http://schemas.xmlsoap.org/wsdl/"
    xmlns:sample="http//www.ibm.com/sample-namespace/"
    xmlns:soap="http://schemas.xmlsoap.org/wsdl/soap"
    xmlns:intf="http://www.ibm.com/intf-namespace/"
    ... >
```

210
```xml
<wsdl:message name="sampleNumber1Request">
    <wsdl:part name="portName" type="xsd:string"/>
    <wsdl:part name="sampleParameter" type="xsd:string"/>
</wsdl:message>

<wsdl:message name="sampleNumber1Response">
    <wsdl:part name="result" type="xsd:boolean"/>
</wsdl:message>

<wsdl:message name="sampleNumber2Request">
    <wsdl:part name="portName" type="xsd:string"/>
</wsdl:message>

<wsdl:message name="sampleNumber2Response">
    <wsdl:part name="result" type="xsd:string"/>
</wsdl:message>
```

510
```xml
<wsdl:message name="extensionNumber1Request">
    <wsdl:part name="portName" type="xsd:string"/>
</wsdl:message>

<wsdl:message name="extensionNumber1Response">
    <wsdl:part name="result" type="xsd:boolean"/>
</wsdl:message>

<wsdl:message name="extensionNumber2Request">
    <wsdl:part name="portName" type="xsd:string"/>
</wsdl:message>

<wsdl:message name="extensionNumber2Response">
    <wsdl:part name="result" type="xsd:string"/>
</wsdl:message>
```

```
<wsdl:portType name="SamplePortType">

<wsdl:operation name="sampleNumber1">
        <wsdl:input message="intf:sampleNumber1Request"/>
        <wsdl:output message="intf:sampleNumber1Response"/>
    </wsdl:operation>

<wsdl:operation name="sampleNumber2">
        <wsdl:input message="intf:sampleNumber2Request"/>
        <wsdl:output message="intf:sampleNumber2Response"/>
    </wsdl:operation>

<wsdl:operation name="extensionNumber1">   521
        <wsdl:input message="intf:extensionNumber1Request"/>
        <wsdl:output message="intf:extensionNumber1Response"/>
    </wsdl:operation>

<wsdl:operation name="extensionNumber2">
        <wsdl:input message="intf:extensionNumber2Request"/>
        <wsdl:output message="intf:extensionNumber2Response"/>
    </wsdl:operation>

</wsdl:portType>
```

225
```
<sample:serviceType name="SampleService">
    <sample:portTypeList>
        <sample:portTypeRef="intf:Sample"/>
        ...
    </sample:portTypeList>
</sample:serviceType>
```

530
```
<wsdl:binding name="SampleSoapBinding"
        type="intf:SamplePortType">
    <soap:binding style="rpc"
            transport="http://schemas.xmlsoap.org/soap/http"/>

<wsdl:operation name="sampleNumber1">                                    231
        <soap:operation soapAction="" style="rpc"/>
        <wsdl:input>
            <soap:body encodingStyle=
                        "http://schemas.xmlsoap.org/soap/encoding/"
                    namespace=
                        "http://www.ibm.com/..."
                    use="encoded"/>
        </wsdl:input>
        <wsdl:output>
            <soap:body
                    encodingStyle=
                        "http://schemas.xmlsoap.org/soap/encoding/"
                    namespace=
                        "http://www.ibm.com/..."
                    use="encoded"/>
        </wsdl:output>
    </wsdl:operation>
    ...
```

```
                                                                531
<wsdl:operation name="ExtensionNumber1">
    <soap:operation soapAction="" style="rpc"/>
    <wsdl:input>
        <soap:body encodingStyle=
                "http://schemas.xmlsoap.org/soap/encoding/"
            namespace=
                "http://www.ibm.com/..."
            use="encoded"/>
    </wsdl:input>
    <wsdl:output>
        <soap:body
            encodingStyle=
                "http://schemas.xmlsoap.org/soap/encoding/"
            namespace=
                "http://www.ibm.com/..."
            use="encoded"/>
    </wsdl:output>
</wsdl:operation>
...
</wsdl:binding>

</wsdl:definitions>
```

DYNAMIC EXTENSION OF NETWORK-ACCESSIBLE SERVICES

BACKGROUND OF THE INVENTION

1. Field of the Invention

The present invention relates to computer software, and deals more particularly with methods, systems, and computer program products for dynamically extending network-accessible services, an example of which is Web services, thereby making additional operations available in a transparent manner.

2. Description of the Related Art

The term "Web service" refers generally to an interface that describes a collection of network-accessible operations. Web services technology is a mechanism for distributed application integration, whereby program-to-program operation is facilitated via distributed network access to software. Web services are also commonly referred to as the "service-oriented architecture" for distributed computing. Web services fulfill a specific task or a set of tasks. A Web service may work with one or more other Web services in an interoperable manner to carry out a complex workflow or a business transaction. For example, completing a complex purchase order transaction may require automated interaction between an order placement service (i.e., order placement software) at the ordering business and an order fulfillment service at one or more of its business partners. In turn, this order fulfillment service may interact with a credit card approval service, a package delivery service, and so forth.

The open industry standards leveraged by Web services to facilitate "just-in-time" distributed application integration include HTTP ("Hypertext Transfer Protocol"), SOAP ("Simple Object Access Protocol"), WSDL ("Web Services Description Language"), and UDDI ("Universal Description, Discovery, and Integration"). HTTP is commonly used to exchange messages over TCP/IP ("Transmission Control Protocol/Internet Protocol") networks such as the Internet. SOAP is an XML-based protocol used to invoke methods in a distributed environment. UDDI is an XML-based registry technique with which businesses may list their services and with which service requesters may find businesses providing particular services. Just-in-time application integration is facilitated by issuing UDDI requests to locate distributed services through a UDDI registry, and dynamically binding the requester to a located service using service information which is conveyed in a platform-neutral WSDL format using SOAP and HTTP messages. Using these components, Web services will provide requesters with transparent access to program components which may reside in one or more remote locations, even though those components might run on different operating systems and be written in different programming languages than those of the requester.

For more information on SOAP, refer to "SOAP Version 1.2 Part 0: Primer, W3C Recommendation 24 Jun. 2003", which is available from the W3C. More information on WSDL may be found in "Web Services Description Language (WSDL) 1.1, W3C Note 15 Mar. 2001", which is also available from the W3C. Detailed information on UDDI is available from the Organization for the Advancement of Structured Information Standards ("OASIS"). HTTP is described in Request For Comments ("RFC") 2616 from the Internet Engineering Task Force, titled "Hypertext Transfer Protocol—HTTP/1.1" (June 1999).

Use of Web services is becoming increasingly popular. As this technology becomes more pervasive, Web service authors and administrators of Web service implementations may want to be able to add additional operations to previously-deployed Web services. As an example, it may be desirable to add management capabilities to the deployed Web services. One way in which this might be done is to have all services provide a base management class that offers management features, and then subclass or extend this base class to offer service-specific details. However, this would be extremely costly, and is not extensible beyond planned-for base classes. (For example, it might be desirable to add operations that do not pertain to management.) In addition, it would be quite time-consuming and disruptive to retroactively update previously-deployed services. Therefore, this is not a viable approach.

The present invention avoids these drawbacks and limitations, enabling dynamic extensions to network-accessible services (such as Web services) to be provided in a transparent manner.

SUMMARY OF THE INVENTION

An object of the present invention is to provide techniques for dynamically extending network-accessible services.

Another object of the present invention is to provide these techniques in a transparent manner.

Still another object of the present invention is to provide techniques for dynamically extending network-accessible services by programmatically modifying the services' advertised capabilities.

A further object of the present invention is to provide programmatic modifications of a service's available operations in a receiver-specific manner.

Yet another object of the present invention is to provide dynamic Web services extensions by leveraging existing server or "engine" capabilities in a novel manner and for a novel purpose.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention may be provided as methods, systems, and/ or computer program products that dynamically extend network-accessible services in a transparent manner. In one preferred embodiment, this comprises creating, responsive to a request for a service's available operations, a response that specifies a first set of one or more operations that are available by invoking the service; and programmatically annotating the response to also specify a second set of one or more operations that are to be dynamically added to the service, such that the response specifies the first set and the second set as the operations that are available by invoking the service.

This embodiment may further comprise sending the programmatically-annotated response to a sender of the request. If a request is subsequently received, from the sender, for an operation from the first set, that operation will be invoked on the service. On the other hand, if the subsequently-received message is for an operation from the second set, that operation will be invoked from a location other than the service.

Preferably, the programmatic annotations are performed by a handler component of an engine that processes requests and responses for the service, and invocations of the operations from the second set are performed by another service, which was dynamically selected at run-time by a handler component that detected the request to invoke an operation from the second set (i.e., an operation that is not part of the original service).

The second set may be determined by consulting a data structure. In a first example scenario, it may comprise management operations for managing the service. In a second example status-changing scenario, it may comprise status-changing operations that operate to dynamically change availability of the operations in the first set. In this second example scenario, one of the status-changing operations may be an operation that must be invoked to dynamically enable use of any of the operations in the first set and/or one of the status-changing operations may be an operation that, when invoked, dynamically disables use of any of the operations in the first set. In a third example scenario, the second set may be dynamically selected based on a role, permissions, or an authorization of the sender of the request for the service's available operations, or based on of the sender. In a fourth example scenario, the operations in the second set may be dynamically selected based on current run-time information.

The present invention will now be described with reference to the following drawings, in which like reference numbers denote the same element throughout.

BRIEF DESCRIPTION OF THE DRAWINGS

FIG. 2 (comprising FIGS. 2A and 2B) depicts a simplified example of a service's WSDL, created according to the prior art, and FIG. 5 (comprising FIGS. 5A-5D) illustrates how this example may be programmatically annotated by preferred embodiments.

DESCRIPTION OF PREFERRED EMBODIMENTS

The present invention defines techniques for dynamically extending network-accessible services in a transparent manner. Preferred embodiments are described herein with reference to implementation in a Web services model. However, this is for purposes of illustration and not of limitation. The disclosed techniques may alternatively be used with network-accessible services that are deployed using other distributed computing paradigms with features of the type leveraged by preferred embodiments (e.g., a facility for providing an on-demand list of a service's available operations, where preferred embodiments programmatically modify that list).

Preferred embodiments of the present invention operate in a Web services environment that uses a SOAP engine such as an Apache extensible Interaction System ("AXIS") engine. It should be noted, however, that references herein to an AXIS engine are by way of illustration and not of limitation: embodiments of the present invention may also be used with other SOAP engines, without deviating from the scope of the present invention. Apache AXIS is an implementation of the SOAP protocol from the Apache Software Foundation. Refer to the Web site of the Apache Software Foundation for more information on Apache AXIS. AXIS is a run-time environment for SOAP services, wherein Web services run using a container model. A servlet called a "router" receives an incoming SOAP request message, determines which code is required to carry out that request, deserializes objects required for that code, and invokes the code. When the invoked code completes execution, the router serializes the result into an outgoing SOAP response message.

Figure 1:
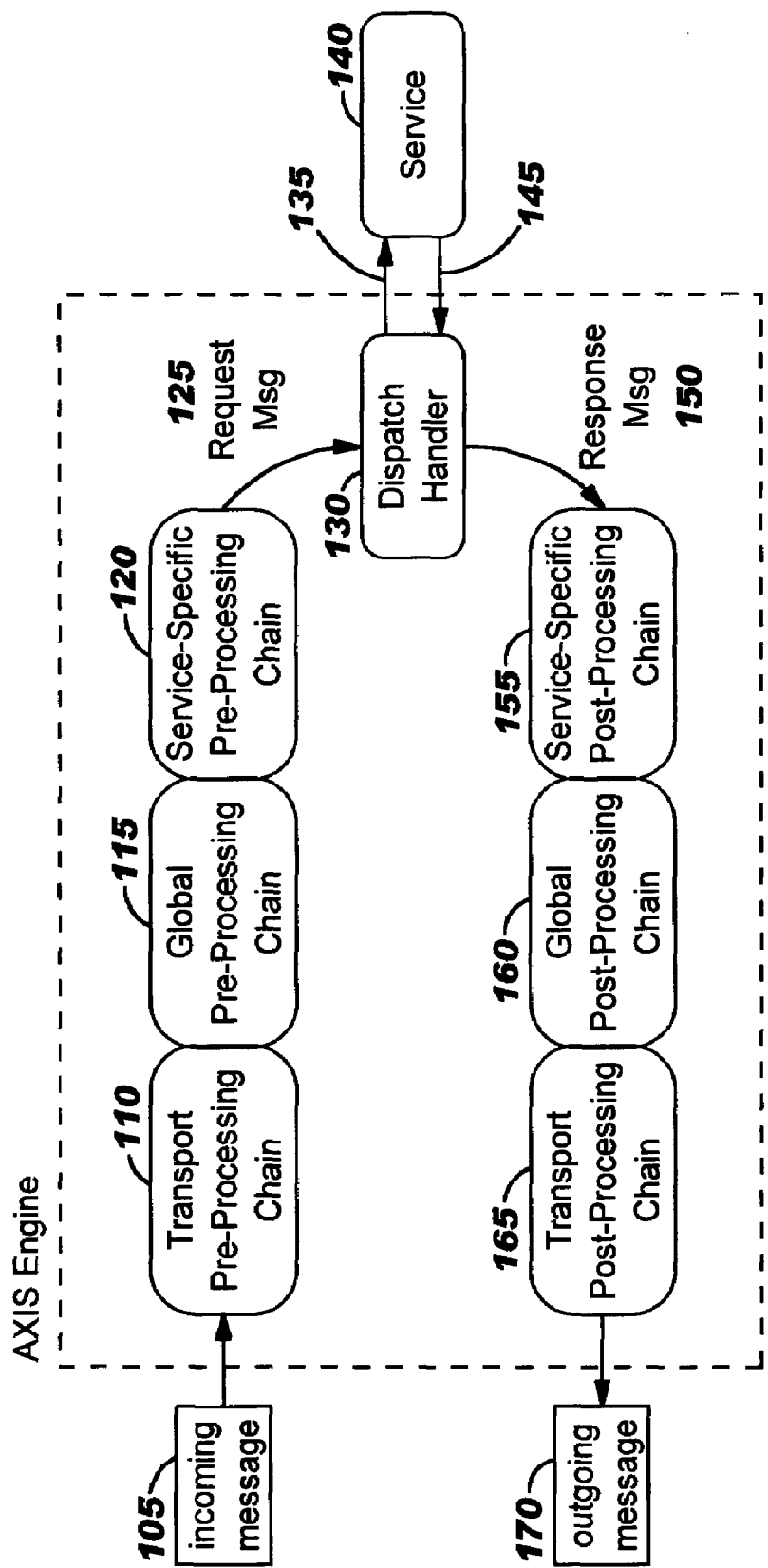
FIG. 1 illustrates a server-side architecture, including categories of handler components, that is leveraged by preferred embodiments.

Built into AXIS is the notion of handlers. A "handler" is executable code that implements a particular function. These handlers are used in an AXIS engine to enable various types of additional processing to take place for a SOAP message, either before or after the Web Service is invoked (e.g., to perform pre- or post-processing of SOAP messages). FIG. 1 shows the basic (server-side) AXIS architecture, as will now be described in more detail.

AXIS uses three different categories of handlers: transport-specific, global, and service-specific. Transport-specific handlers are shown at reference numbers 110 and 165, representing a pre-processing handler and a post-processing handler, respectively. Global handlers are shown at reference numbers 115 and 160. Service-specific handlers are shown at reference numbers 120 and 155. For an incoming SOAP request message 105, the handlers are executed or invoked by the SOAP server in the order of transport-specific 110, global 115, and service-specific 120. For an outgoing SOAP response message 150, the handlers are executed or invoked by the SOAP server in the reverse order, namely service-specific 155, global 160, and transport-specific 165.

Transport-specific handlers are executed only when the SOAP message is delivered to the SOAP engine over a certain protocol. For example, an HTTP transport-specific handler operates on messages arriving over HTTP, and a different transport-specific handler processes messages arriving over the File Transfer Protocol ("FTP"). Similarly, one transport-specific handler is used for outgoing messages to be transmitted using HTTP, and a different transport-specific handler is used for messages to be transmitted using FTP. Global handlers are executed for all Web service messages, regardless of the transport used. Service-specific handlers are specific to the Web service being invoked, thereby allowing for service-specific types of message customization or processing.

Note that FIG. 1 uses the term "chain" in elements 110-120 and 155-165. The sequence of handlers to be used forms what is termed an AXIS "chain" or "handler chain". More than one handler may be used within any of the three categories, each passing its output to the next handler. For a particular service "XYZ", for example, a service-specific chain prescribes what service-specific handlers to invoke when a message is received for service XYZ or generated by service XYZ. An AXIS handler chain thus defines a sequence of handlers to dictate the order in which handlers in the various categories will process incoming and outgoing messages.

Typically, a deployment descriptor is used to specify (inter alia) how a particular service is to be deployed and what AXIS handler chain to use for messages pertaining to that service. For example, SOAP message exchanges for a particular service may use encrypted data. Upon receiving a message containing encrypted data, a service-specific decryption handler specified in the deployment descriptor would decrypt the data (as a pre-processing step) and pass it to the appropriate message-processing code. When a result is returned, a service-specific encryption handler specified in the deployment descriptor encrypts the result (as a post-processing step) prior to transmitting the result in another SOAP message.

After an incoming message 105 is given to the SOAP engine (i.e., to the AXIS engine, in preferred embodiments) to be processed, it passes through each handler in each of the three types of chains until it reaches a component referred to as a "dispatch handler". See reference numbers 125 and 130 of FIG. 1, where the request message 125 resulting from application of handler chains 105, 110, 115 is passed to dispatch handler 130. This handler 130 is responsible for locating and invoking the desired Web service. See reference numbers 135, representing the service invocation, and 140, representing the target Web service. Any result from the Web service invocation (see reference number 145) is then converted into a SOAP message by dispatch handler 130, and the processing flow continues through the response side of the handler chains in reverse group order. Thus, FIG. 1 shows response message 150 passing through handler chains 155, 160, and 165 before being transmitted as outgoing message 170.

As noted in FIG. 1, the handler chains before the dispatch handler are referred to generally as "pre-processing" handler chains and the ones after the dispatch handler are referred to generally as "post-processing" handler chains. Handlers can be defined in any handler category, to be invoked either as a pre-processing handler or a post-processing handler. So, by specifying on which side of the dispatch handler a handler should reside and in which category, an administrator can use handlers to modify incoming or outgoing messages as needed.

One interesting aspect of the AXIS design is that this flow through the handlers is not limited to Web service invocation processing. That is, the SOAP engine will traverse the list of handlers in other cases as well—for example, when a client requests the WSDL for a service. The WSDL for a service specifies information such as what operations that service performs and what messages and message parameters are used by those operations. Thus, a client can request a service's WSDL to dynamically determine what operations it can invoke on that service.

A simplified example of a service's WSDL 200 is shown in FIG. 2 (comprising FIGS. 2A and 2B). As shown therein, the WSDL typically begins by specifying definitions 205 that include namespace definitions to be used within the WSDL. A set of message definitions 210 is specified, along with a portType definition 215. The portType definition associates the messages from 210 with the operations 220 that use those messages. A serviceType definition 225 and a WSDL binding specification 230 are also typically included. (This sample WSDL 200 is provided by way of illustration only.)

When the client requests a service's WSDL, the AXIS engine will iterate over the handlers, but instead of calling the "invoke()" method for each defined handler (as it does when the incoming message pertains to execution of a Web service), it will instead call the "generateWSDL()" method for each handler. This is done to ensure that each handler is given the opportunity to act in response to the message, or to even modify the message itself by adding new WSDL artifacts it feels are needed, such as additional header information or even additional WSDL for the service itself And just as in the case of invoking the service, the dispatch handler has a special role here as well: it is responsible for retrieving or generating the WSDL for the service specified in the WSDL-requesting SOAP message.

Figures 3A, 3B, 4:
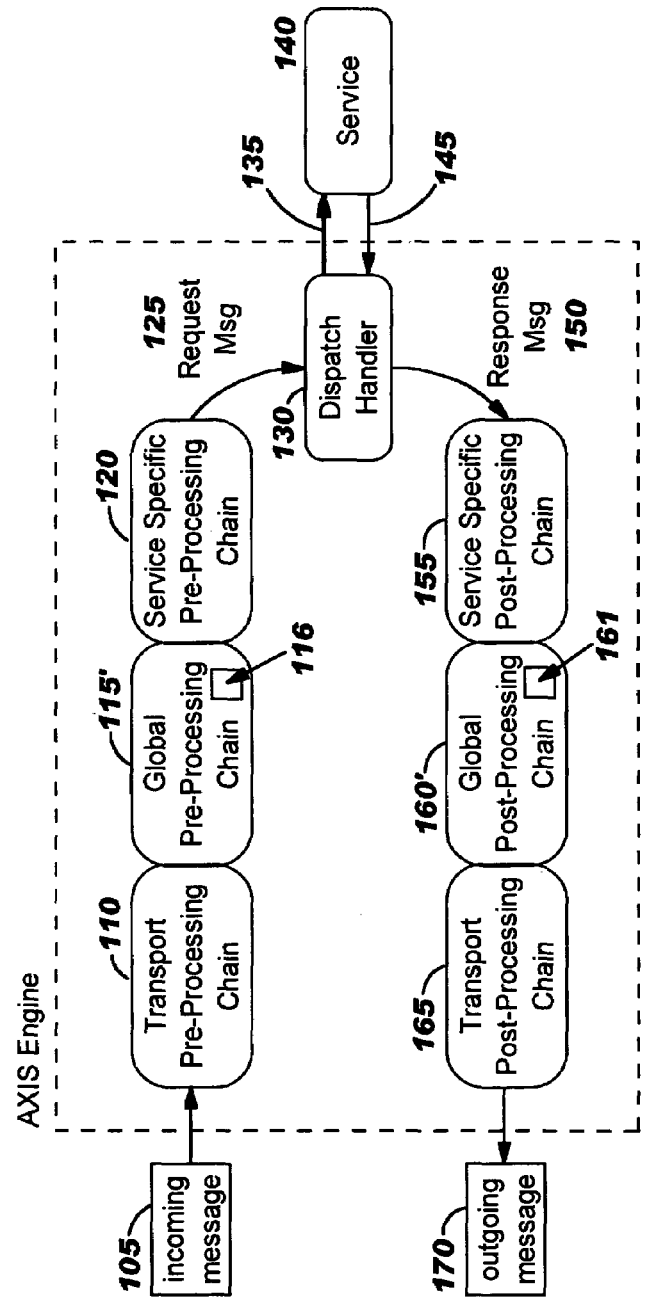
FIG. 4 shows how new handler components used by preferred embodiments are preferably positioned within this architecture.
FIGS. 3A and 3B are used to illustrate request messages that may be sent by a client operating in the environment depicted in FIG. 1 or FIG. 4 to request a particular service (in FIG. 3A) or to request the WSDL associated with that Web service (in FIG. 3B).

As noted above, when a service is deployed, a pointer to the WSDL for the service may optionally be specified as part of the deployment information. A client may ask the SOAP engine to provide the WSDL associated with a particular Web service by issuing an HTTP GET to the uniform resource locator ("URL") for the service with a "?wsdl" parameter appended to the end of the URL. For example, suppose a "StockQuoteService" is available from the URL shown in FIG. 3A. To get the WSDL for this service, an HTTP GET request specifying the WSDL-requesting URL shown in FIG. 3B is used. When this WSDL-requesting HTTP GET request is received by the SOAP engine, it will invoke the "generateWSDL()" method on each of the handlers (i.e., transport-specific, global, and service-specific) associated with the specified Web service. If the SOAP engine finds the pointer to the WSDL that was provided during deployment, then that WSDL is retrieved or generated and returned by the dispatch handler. If there is no WSDL pointer, then the dispatch handler will dynamically generate the WSDL, preferably using introspection of the Web service's Java™ object. In either case, after the dispatch handler's "generateWSDL()" method returns, the SOAP engine will now have the WSDL for the service, and will begin to invoke the post-processing handlers. This WSDL processing occurs in the prior art. ("Java" is a trademark of Sun Microsystems, Inc.)

Preferred embodiments of the present invention leverage the extensible handlers concept of the SOAP engine to dynamically extend the available operations for a Web service. When a client requests the WSDL for a service, preferred embodiments programmatically modify or annotate the WSDL obtained by the dispatch handler such that the modified WSDL includes the operations that are to be added. This allows the requesting client to see the new operations (and even to generate client-side proxy classes based on them). When the client subsequently invokes one of the dynamically-added operations, the extensibility of the SOAP engine is again leveraged to intercept the incoming message, detect that it is actually intended for one of these "new" operations, and route the request to the extension code rather than to the original Web service that is specified on the incoming message.

Using this approach, one or more previously-deployed Web services can be dynamically extended without requiring any changes to the Web services, in a manner that is totally transparent to the client, the SOAP engine, and the Web service itself. The manner in which preferred embodiments achieve this dynamic yet transparent extension of Web services will now be described in more detail with reference to FIG. 4.

According to preferred embodiments, two additional handlers are configured that will extend a previously-deployed Web service. Preferably, these additional handlers are global handlers, and are added to the global handler chains, so that messages of all types will be processed in this manner. FIG. 4 shows the location of the new handlers used in preferred embodiments. As shown therein, global pre-processing handler chain 115' now includes a new handler 116, and global post-processing handler chain 160' now includes a new handler 161.

Referring first to the new handler 161 that is used for outgoing messages, in preferred embodiments this handler modifies the WSDL that was returned 150 by the dispatch handler 130 (and then processed by service-specific post-processing handlers 155, if appropriate) by adding new operations that are to be exposed for this service. For example, to add basic Web services manageability functionality, it may be desirable to add operations such as "disable()", "enable()" and "getStatistics()" to one or more previously-deployed Web services. To do so, handler 161 preferably adds the related information necessary for the new operations (perhaps by reading from a template or other configurable data structure where this information has been added, preferably by a systems administrator) to the WSDL returned by the dispatch handler, such that once the WSDL is returned to the client, the client now sees these additional operations and the operations appear as though they are just part of the Web service's "native" functionality. The client can now invoke these operations without realizing they were not part of the "native" operations that were available in the Web service when it was deployed.

FIG. 5 (comprising FIGS. 5A-5D) shows a simple example of the information that might be added to WSDL 200 of FIG. 2 by handler 161, programmatically extending that WSDL to include new operations. (For purposes of illustration only, all extensions in FIG. 5 use the word "extension" in their names.) As shown in FIG. 5A, modified WSDL 500 now includes several new message definitions 510, in addition to the message definitions 210 that reflect the messages of the Web service as it was deployed. FIG. 5B illustrates how the port-Type definition 215 of FIG. 2A may be modified by preferred embodiments, creating a revised portType definition 515 that includes the programmatically-added operation definitions 520 as well as operations 220 pertaining to the Web service as it was deployed. As shown in FIG. 5C, the serviceType definition 225 appears unchanged in modified WSDL 500, according to preferred embodiments. FIGS. 5C and 5D illustrate the modified binding 530, which is preferably created by extending the original binding 230 from FIG. 2B so that it includes the operations 231 from the original binding specification 230, as well as the operations 531 that have been programmatically generated according to preferred embodiments.

In an alternative approach, rather than including the extension operations within the portType of the original service (as shown at 520 in FIG. 5B), a new portType may be programmatically generated (e.g., as a sibling of the portType element 215 of FIG. 2A) for the extensions. An additional binding element is then preferably generated for this new portType (e.g., as a sibling of the binding element 230 of FIG. 2B), and the extension operations are specified within this new binding element rather than including them within the binding element of the original service (as shown at 530 in Fig 5D). However, this approach is somewhat less transparent than the approach shown in FIG. 5.

As will be obvious, the particular extensions to be made to a WSDL specification may vary widely. FIG. 5 is therefore intended to be illustrative but not limiting.

Referring now to the second handler added by preferred embodiments, handler 116, used for incoming messages, is also invoked as part of the SOAP server's normal processing mode, according to preferred embodiments. This handler examines the incoming SOAP message and determines (preferably by reading from the same template or configurable data structure used by handler 161) whether the operation being invoked is one of these new "extensions". If so, it will instruct the SOAP engine (or more specifically the dispatch handler) to locate and invoke the extension's Web service instead of the originally-specified Web service.

For example, if a client calls one of the Web services manageability operations that was added by handler 161 when the WSDL for a given service was requested, handler 116 will modify the message and/or internal AXIS state data so that the dispatch handler will locate and invoke the requested operation on the management service object instead. With reference to the example WSDL 500 in FIG. 5, the client sees a service extension such as the operation "extensionNumber1" 521 of FIG. 5B as being part of the service named "SampleService" 525 of FIG. 5C. Accordingly, the client invokes this operation in the same manner as the originally-deployed service 221 of FIG. 2A would be invoked. Since service 521 is not actually part of service 225 (which is the original service, shown in the extended WSDL at 525 of FIG. 5C), handler 116 and dispatch handler 130 identify the request as being for an extension created according to the present invention (preferably, by inspecting the first SOAP Body element of the incoming message) and therefore perform the processing described herein on that message.

Thus, it can be seen that use of these new handlers allows preferred embodiments to "virtually" extend one or more Web services dynamically, without requiring any changes to the services themselves, in a manner which is totally transparent to the client, the SOAP engine, and the Web service.

In a second aspect of preferred embodiments, the added handlers of preferred embodiments can be used to change the behavior of a SOAP engine for already-deployed Web services, without changing the Web service or the SOAP engine. For example, the AXIS engine does not have the notion of "disabling" a service. Using handlers as described herein, an "enable()" and "disable()" operation can be programmatically added to one or more Web services by handler 166 (or another global post-processing handler that modifies WSDL according to techniques disclosed herein) as it modifies the WSDL of the services, and in addition, code can be added to the pre- and post-processing handlers to also modify and/or check state data pertaining to the enablement status of a Web service. In this manner, handlers 116 and 161 (or, alternatively, an additional global pre- and post-processing handler) can do the "enabling" and/or "disabling" of a particular service on the Web service's behalf When a regular service request is sent through this new handler, if the state data indicates that the service is disabled, then the handler can stop the execution immediately (and may return a fault back to the client).

Suppose, for example, that handler 161 modifies the WSDL of Web service "ABC" to include "enable" and "disable" operations. Preferably, an enablement status in state data for Web service "ABC" is also initialized to "disabled". Then, when the client receiving the modified WSDL sends an "enable" request message, the "enable" code invoked by dispatch handler 130 sets the enablement status to "enabled". On the other hand, if the client sends other request messages for Web service "ABC" prior to sending the "enable" request, a fault is preferably returned, informing the client that Web service "ABC" is currently disabled.

Note that this type of state data being managed for a service by the handlers (e.g., whether the service is considered enabled or disabled) is preferably stored externally from the SOAP engine. Thus, this second aspect allows extending features of the SOAP engine, in addition to extending Web services that can be invoked through that engine. Furthermore, enablement status is illustrative, but not limiting, of the type of status information that may be deemed useful when using this second aspect.

In a third aspect of preferred embodiments, embodiments of the present invention may be used to control which operations are available to and/or seen by clients. The WSDL may be annotated in a conditional manner, according to this third aspect. For example, as handler 161 modifies the WSDL requested by the client, a conditional decision can be made about which operations to add to the WSDL based on information such as the client's authorization level, such that only selected clients are informed of the availability of certain service extensions. Likewise, handler 116 may control which clients are allowed to actually invoke each operation, based on (for example) the invoker's authorizations, privileges, or role-based permissions. In addition, this aspect may programmatically remove one or more originally-deployed operations from the WSDL, based on the conditional decision made by handler 161.

As an example of using this third aspect, it might be desirable to expose management operations only to users acting in the role of "Admin". Or, it might be desirable to expose an identical set of extended operations to all WSDL requesters, but to filter those requests in handler 116 to only allow (as one example) clients having the "Admin" role to actually invoke those operations. Thus, this "gating" feature of handler 116 can be done independently of handler 161's work. This third aspect enables enforcing access controls so that only certain trusted clients, only clients having certain identities or roles, and so forth can be allowed to actually invoke the extensions.

Conditional annotations performed according to this third aspect may alternatively enforce controlled access to the Web service extensions based on other factors, such as the enabled/disabled status (or other state data) of the Web service that is provided when using the second aspect, current run-time information such as network traffic levels, and so forth. Access controls pertaining to privileges or roles are therefore an illustrative, but not limiting, use of this third aspect.

As has been demonstrated, techniques disclosed herein enable flexibly extending Web services by programmatically annotating the services' WSDL using AXIS handlers. The extension is, in fact, a virtual or simulated extension, in that the underlying Web services are not actually modified in any way (and are not required to have an awareness of the extensions). Disclosed techniques are therefore totally transparent to the Web services, the SOAP engine, and the clients invoking the extended operations. Furthermore, the second and third aspects enable managing the extended operations and controlling access thereto in novel ways, as well as extending the features of the SOAP engine, as has been described.

While preferred embodiments have been described herein with reference to an AXIS engine, another SOAP engine supporting extensible handlers may be substituted without deviating from the scope of the present invention. Furthermore, while SOAP is the preferred standard messaging format in the art for invoking Web services, references to the SOAP protocol should be construed as including other protocols providing similar semantics for access to distributed services. In addition, embodiments of the present invention may be used in processing engines that provide for extending services but do not support the handler concept as described herein. In these processing engines, embodiments of the present invention preferably programmatically modify a specification of available operations such as the WSDL depicted in FIGS. 2 and 5, thereby extending the client's view of available operations, and then recognize invocations that reference the extensions such that the invocations can be re-routed to the extension code.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flow diagrams and/or block diagrams of methods, apparatus (systems), and computer program products according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include the preferred embodiments and all such variations and modifications as fall within the spirit and scope of the invention.

What is claimed is:

1. A method of dynamically extending operations available from a network-accessible service, comprising:
   receiving, at an engine from a client, a request for a list of operations available by invoking the network-accessible service, the engine adapted for processing the request using a pre-processing handler set and a post-processing handler set, the pre-processing handler set comprising at least one pre-processing handler and the post-processing handler set comprising at least one post-processing handler;
   inserting, into the pre-processing handler set, an additional pre-processing handler and into the post-processing handler set, an additional post-processing handler;
   creating, by the engine responsive to receiving the request, a response comprising a markup-language document specifying, as the requested list, a first set comprising at least one operation that is available by invoking the network-accessible service; and
   programmatically annotating the markup-language document, by the inserted additional post-processing handler, to also specify, in the requested list, a second set comprising at least one operation that is not available by invoking the network-accessible service, such that the response specifies the first set and the second set as the list of operations that are available by invoking the network-accessible service, wherein the additional pre-processing handler is adapted to respond to a subsequent request for invoking any of the at least one operation from the second set by invoking code not deployed in the network-accessible service.

2. The method according to claim 1, further comprising the step of sending the programmatically-annotated response to the client.

3. The method according to claim 1, wherein the first set is determined by consulting a deployment descriptor specification corresponding to the network-accessible service and the second set is determined by consulting a data structure separate from the deployment descriptor specification.

4. The method according to claim 1, wherein the second set comprises at least one management operation for managing the network-accessible service.

5. The method according to claim 1, further comprising:
subsequently receiving, at the engine from the client, a later-sent request for invoking a particular one of the at least one operation from the first set; and
invoking, responsive to receiving the later-sent request, the particular operation on the network-accessible service.

6. The method according to claim 1, further comprising:
subsequently receiving, at the engine from the client, the subsequent request for invoking a particular one of the at least one operation from the second set; and
invoking, by the engine responsive to receiving the subsequent request, the particular operation from the code not deployed in the network-accessible service using information provided for the invoking by the inserted additional pre-processing handler.

7. The method according to claim 6, wherein the subsequently-received request is rejected by the inserted additional pre-processing handler, instead of performing the invoking, if the client is not authorized to invoke the particular operation.

8. The method according to claim 1, wherein the second set comprises at least one status-changing operation that operates to dynamically change availability of the at least one operation in the first set.

9. The method according to claim 8, wherein a selected one of the at least one status-changing operation is an operation that must be invoked to dynamically enable use of any of the at least one operation in the first set.

10. The method according to claim 8, wherein a selected one of the at least one status-changing operation is an operation that, when invoked, dynamically disables use of any of the at least one operation in the first set.

11. The method according to claim 1, wherein each of the at least one operation in the second set is dynamically selected based on a role of a user of the client.

12. The method according to claim 1, wherein each of the at least one operation in the second set is dynamically selected based on permissions of a user of the client.

13. The method according to claim 1, wherein each of the at least one operation in the second set is dynamically selected based on authorization of a user of the client.

14. The method according to claim 1, wherein each of the at least one operation in the second set is dynamically selected based on current run-time information.

15. The method according to claim 1, further comprising:
subsequently receiving, at the engine from the client, the subsequent request for invoking a particular one of the at least one operation from the second set;
determining, by the inserted additional pre-processing handler, whether the client is authorized to invoke the particular operation;
invoking the particular operation from a location other than the network-accessible service, if the determining has a positive result; and
not invoking the particular operation otherwise.

* * * * *